US012522945B2

(12) United States Patent
Belenguer Rizo et al.

(10) Patent No.: US 12,522,945 B2
(45) Date of Patent: Jan. 13, 2026

(54) PROCEDURE FOR FINISHING STAINLESS STEEL PARTS

(71) Applicant: ACONDICIONAMIENTO TARRASENSE, Terrassa (ES)

(72) Inventors: Marc Belenguer Rizo, Terrassa (ES); Laurent Aubouy, Terrassa (ES); Mercè De La Fuente Jorda, Terrassa (ES); Antoni Meseguer Guallar, Terrassa (ES); Laura Soldi, Terrassa (ES); Martí Calvet Molinas, Terrassa (ES); Anna Domenech Castells, Terrassa (ES); Eva Dominguez Hervella, Terrassa (ES)

(73) Assignee: ACONDICIONAMIENTO TARRASENSE, Terrassa (ES)

( * ) Notice: Subject to any disclaimer, the term of this patent is extended or adjusted under 35 U.S.C. 154(b) by 696 days.

(21) Appl. No.: 17/909,948

(22) PCT Filed: Feb. 25, 2021

(86) PCT No.: PCT/EP2021/054694
§ 371 (c)(1),
(2) Date: Sep. 7, 2022

(87) PCT Pub. No.: WO2021/180480
PCT Pub. Date: Sep. 16, 2021

(65) Prior Publication Data
US 2023/0104538 A1 Apr. 6, 2023

(30) Foreign Application Priority Data
Mar. 9, 2020 (EP) .................... 20382167

(51) Int. Cl.
C25F 3/24 (2006.01)
B22F 10/28 (2021.01)
B22F 10/62 (2021.01)
B33Y 40/20 (2020.01)
C23F 1/28 (2006.01)
C23F 17/00 (2006.01)
C23G 1/08 (2006.01)

(52) U.S. Cl.
CPC ............... *C25F 3/24* (2013.01); *B22F 10/62* (2021.01); *B33Y 40/20* (2020.01); *C23F 1/28* (2013.01); *C23F 17/00* (2013.01); *C23G 1/08* (2013.01); *C23G 1/081* (2013.01); *C23G 1/083* (2013.01); *C23G 1/085* (2013.01); *B22F 10/28* (2021.01)

(58) Field of Classification Search
CPC ....................................................... C25F 3/24
See application file for complete search history.

(56) References Cited

U.S. PATENT DOCUMENTS

| 2,622,814 | A | * | 12/1952 | Benke | .................... | B65H 16/04 |
| | | | | | | 248/905 |
| 2,662,814 | A | | 12/1953 | Swihart | | |
| 3,457,107 | A | | 7/1969 | Mickelson et al. | | |
| 3,709,824 | A | * | 1/1973 | Oda | .................... | C11D 7/08 |
| | | | | | | 134/28 |
| 4,372,831 | A | | 2/1983 | Rosswag | | |
| 5,209,820 | A | | 5/1993 | Tytgat et al. | | |
| 11,873,572 | B2 | * | 1/2024 | Klower | .................... | C25F 7/00 |
| 2002/0189632 | A1 | | 12/2002 | Glock et al. | | |
| 2018/0290212 | A1 | * | 10/2018 | Jaworowski | ........... | F28F 3/025 |
| 2020/0063017 | A1 | * | 2/2020 | Todd | .................... | E21B 37/06 |
| 2021/0138552 | A1 | * | 5/2021 | Hildreth | ............... | C04B 35/565 |

FOREIGN PATENT DOCUMENTS

| CN | 108642557 A | 10/2018 |
| GB | 1147989 A | 4/1969 |

* cited by examiner

Primary Examiner — Brian W Cohen
(74) Attorney, Agent, or Firm — HDC Intellectual Property Law, LLP; Don D. Cha

(57) ABSTRACT

The present invention relates to a procedure for finishing stainless steel parts. The finishing process of the invention is particularly useful for stainless steel parts of complex structure such as those produced by additive manufacturing of metals.

9 Claims, 1 Drawing Sheet

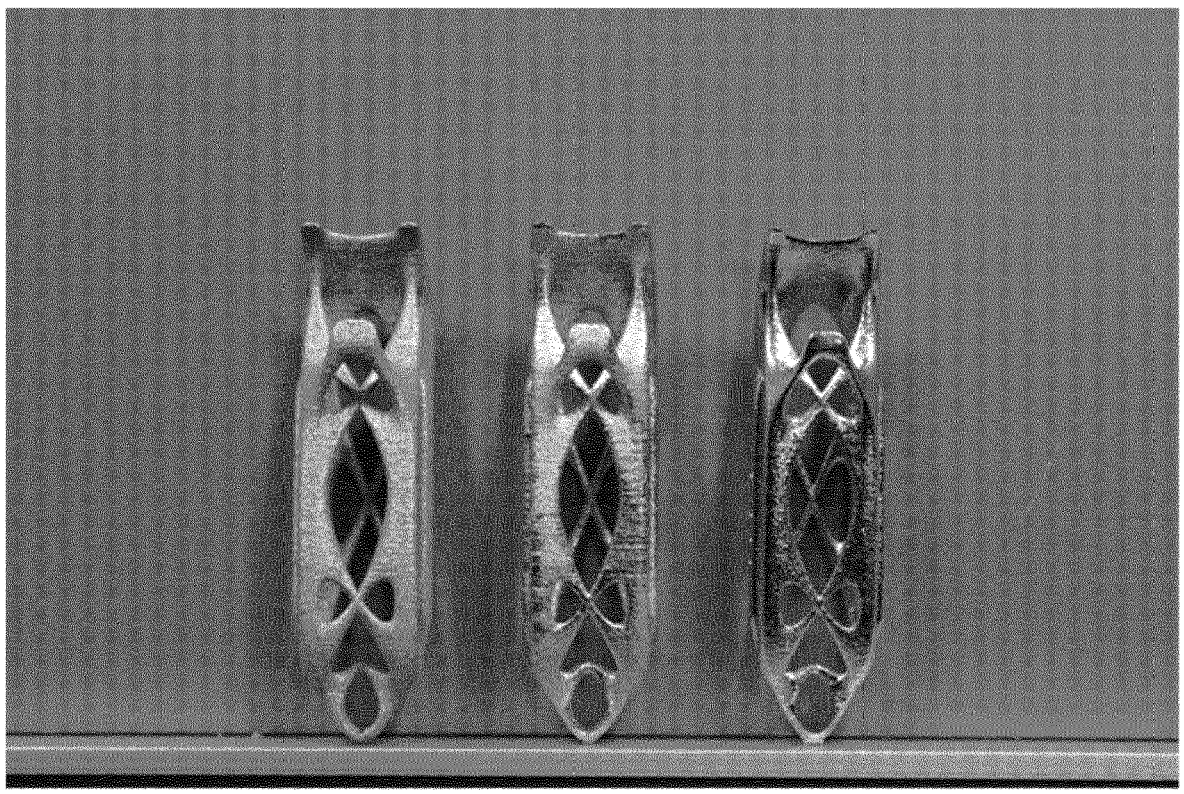

PROCEDURE FOR FINISHING STAINLESS STEEL PARTS

CROSS-REFERENCE TO RELATED APPLICATIONS

This application is a U.S. National Stage Patent Application under 35 U.S.C. § 371 of PCT Patent Application No. PCT/EP2021/054694, filed Feb. 25, 2021, entitled "Procedure for Finishing Stainless Steel Parts," which claims the priority benefit of EP Patent application Ser. No. 20/382, 167.3, filed Mar. 9, 2020, all of which are incorporated herein by reference in their entirety.

The present invention relates to a procedure for finishing stainless steel parts.

The finishing process of the invention is especially useful in stainless steel parts with complex structures such as those produced by additive metal fabrication.

The finishing procedure of the invention comprises first a chemical polishing and secondly an electrochemical polishing in order to obtain a part with a reduced surface roughness, and a mirror finish.

BACKGROUND OF THE INVENTION

The emergence of additive manufacturing has been a major breakthrough in recent times. The various additive manufacturing technologies allow the creation of complex shaped parts. These complex shapes make the polishing step of the part complicated and difficult since the surfaces to be polished are not easily accessible and have a surface roughness that is typical of the process and that is not acceptable if the part is to be used directly without a finishing process.

Surface roughness affects different properties of the part, such as fatigue resistance, friction properties and heat transfer.

The finishing step in this type of parts is very specific due to the geometric complexity of these parts and their final requirements.

The finishing step is extremely important in the final part, since, for example, the parts can be elements of a machine in contact with other parts and the surface roughness influences their behaviour. Improving the finishing step involves decreasing the surface roughness of the part, this leads to a longer durability of the part and to the part performing better.

On the other hand, the final finish of the piece has a significant influence on its final cost from the point of view of the client's appreciation, assuming up to 40% of the value given to it on the market.

Reducing roughness is essential in many applications where it is necessary to work with stainless steel; from surgical tools where high precision is required and corrosion initiation points are avoided, to more complex structures such as heat exchangers. The machining, until now used to reduce the roughness, becomes meaningless and can even be ineffective when dealing with complex structures manufactured by additive manufacturing.

One way of reducing the roughness of the parts is electropolishing, which is a surface treatment by which the metal to be polished acts as an anode in an electrolytic cell, dissolving itself. With the application of current, a polarized film is formed on the metal surface under treatment, allowing the metal ions to diffuse through the film. Micro and macro projections, or high spots on the rough surface, as well as burring areas, are areas of higher current density than the rest of the surface, and dissolve at a higher rate, resulting in a smoother, level and/or burring surface.

In the case of electropolishing it is necessary to define voltage/amperage ratios for the different volumes and types of material of the parts to be electropolished. In the case of electro-polishing, the difficulty lies in polishing ducts and the areas that are shielded by the geometry of each part. These complicated geometries are frequent due to the optimized designs typical of additive manufacturing.

The patent with publication number US2019/0177872 describes a method and equipment for electropolishing the inner surfaces of metal parts obtained by three-dimensional printing. To polish the surfaces, a cathode is inserted into a slow-diffusion electrolyte. The electrolyte has a higher viscosity than water, with the presence of alcohol at a slightly acid or basic pH. The procedure is carried out at temperatures below the ambient temperature. In the case of 3D parts, in order to bring the cathode closer to the inner surfaces, it is covered with a spacer element that prevents the direct contact of the electrode with the surface of the part to be polished. This spacer is easily damaged over time by the working conditions where it is used.

The patent with publication number US2002/189632 describes a method of removing deposits of material which are formed in laser machine. This document does not describe additive manufacturing technologies. The deposits are removed by at least one of the methods pickling method and/or electropolishing method; the pickling method only uses non oxidizing agent.

The U.S. Pat. No. 2,662,814 refers to a method and composition for chemically polishing metals, the patent was files on 1949 and the metal piece for polish are not the complex structures made by additive manufacturing.

As far as the state of the art is concerned, it is necessary to develop a procedure for finishing stainless steel parts obtained by additive manufacturing that reduces the roughness of both the external and internal surfaces of the parts and that achieves a mirror finish that reflects the lack of surface roughness.

DESCRIPTION OF THE INVENTION

The present invention relates to a procedure for finishing stainless steel parts manufactured by additive manufacturing. The additive manufacturing process makes it possible to obtain stainless steel parts with a complex structure which have a surface roughness characteristic of the process and which must be reduced in order to make the part usable.

The finishing procedure described in the present invention combines chemical polishing with electropolishing to overcome the weaknesses of these separate types of polishing. With the polishing of the invention for the same finish carried out by the chemical polishing or electropolishing, less time is required, so that in addition to time, energy is saved. If only the electropolishing is carried out to achieve the same quality of the final surface, more material would be lost and the edges of the parts would be disfigured, compromising the required tolerances in the finished parts, in addition to not being able to sufficiently reduce the roughness of the internal surfaces and if only the chemical polishing is carried out, the same quality of the final surface would not be achieved.

Chemical polishing per se is not capable of achieving the roughness reduction of electrochemical polishing and should therefore only be used as a pre-step to electropolishing. The present invention shows, as can be seen in the examples, a synergy of both polishes provided that first the chemical polishing and then the electrochemical polishing are used in that order.

The combination of both types of polishing overcomes the limitations of the techniques separately, with such a combination less material is lost in the finishing process and the energy consumption is reduced since the times of electropolishing are shortened, moreover with the procedure of the invention a mirror type finish is obtained that reflects the image faced.

The first aspect of the present invention relates to a procedure for finishing stainless steel parts manufactured by additive manufacturing comprising the steps of
 (a) place the part into an acidic aqueous solution with a pH of 0 to 4 comprising non-oxidising acids and oxidising acids
 (b) after step (a) place the part into water;
 (c) after step (b) place the part into an acid solution with a pH of 0 to 4 and polish the part by electropolishing, where the part is connected to a positive pole so that it is the anode and the cathode is connected to the negative pole.

In this description the term "non-oxidising acids" refers to an acid whose anion is a weaker oxidising agent than $H_3O^+$.

In this description the term "oxidising acids" refers to acids whose anion is an oxidising agent stronger than $H_3O^+$ and also acts as an oxidising agent.

This finishing process is particularly useful for parts obtained by additive manufacturing. In this report the term "additive manufacturing" refers to the process of joining materials to create objects from a 3D model, the joining usually occurs layer by layer. Parts obtained by additive manufacturing have surfaces which are difficult to access and which are polished by the procedure of the invention.

BRIEF DESCRIPTION OF THE DRAWINGS

FIG. 1 shows a comparative picture on the left showing an unpolished part, in the middle the electrochemically polished sample with a 12% loss of matter and on the right a part polished with the procedure of the invention with a 12% loss of matter.

DESCRIPTION OF A PREFERRED EMBODIMENT

As discussed above, the first aspect of the invention relates to a process of finishing stainless steel parts manufactured by additive manufacturing comprising the steps of
 (a) place the part in an acidic aqueous solution with a pH of 0 to 4 comprising non-oxidising acids and oxidising acids
 (b) after step (a) place the part into the water;
 (c) after step (b) place the part into an acid solution with a pH of 0 to 4; and polish the part by electropolishing, where the part is connected to a positive pole so that it is the anode and the cathode is connected to the negative pole.

The element is preferably manufactured by means of selective laser melting (SLM). With this method, highly complex geometries can be obtained. The procedure of the invention polishes homogeneously the complex geometries obtained by selective laser melting.

With the procedure of the invention, complex parts are polished both on their inner and outer surfaces.

In particular the starting product is 316L stainless steel parts manufactured by SLM additive manufacturing.

Preferably step a) is performed in the presence of additives.

Examples of additives are surfactants such as: ethoxyl terpene, dialkylthiourea, ethylene glycol propoxyl monobutyl ether, nonylphenol ethoxylate, C12-C18 fatty acids, ethoxylated C12-C18 fatty acids, alkyl(C10-C13) benzene sulfonic acid, lauryl ether sulfate, cocoamidopropyl betaine cocosamine, alkyl dimethyl amine oxide, cocoyl bis-(2-hydroxyethyl) amine oxide, lauramine oxide, N,N-dimethyltetradecyl amine oxide, quaternary ammonium compounds, benzyl-C12-16-alkyl dimethyl, non-ionic surfactants such as triton-X-405.

The additives can be of nitrogenous additives such as: mono ethanol amine, diethanol amine, triethanol amine, methoxypropylamine, monoisopropylamine, ethalamine, dimethylamine, butylamine, diethylamine, butyl diethylamine, polyNmethylaniline and polyaniline. triazole, tretazole and derivatives, imidazole and derivatives, pyrazole, pyrazine derivatives such as 2-aminopyrazine, 2-methylpyrazine, and 2-amino 5-bromopyrazine, nicotinic acid, thiourea, thiosemicarbazide and thioacetamide, sulfonamides and semicarbazones, thiazole derivatives such as 2-mercaptothiazoline and 2-amino-5-mercapto-1,3,4-thiadiazole, benzisothiozole-3-piperizine hydrochloride Other examples of additives are: benzyl triphenylphosphonium bromide; organic polyhydroxides such as propylene glycol, ethylene glycol and glycerol; natural chemical compounds such as tannins, alkaloids such as berberine, organic molecules such as xanthene and xanthosine, 1,3-dicetone malonates, bis (benzimidazole-2-yl) disulfide, ketoconazole, amino acids such as L-leucine, glycine, ascorbic acid, citric acid, acrylic terpolymer, butyl acrylate, methyl methacrylate, acrylic acid.

Preferably non-oxidizing acid is selected from phosphoric acid, sulfuric acid and hydrochloric acid, and preferably oxidizing acid is selected from nitric acid and perchloric acid. Most preferably in step (a) the acidic aqueous solution is 1% to 50% phosphoric acid, 1% to 20% hydrochloric acid and 1% to 30% nitric acid.

Preferably the percentage of additives in the solution is 1% to 20%. Preferably the duration of step a) is 10 minutes to 8 hours. Preferably step a) is carried out in a temperature range between 20° C. and 100° C. Preferably between 25° C. and 80° C.

Preferably the water in step b) is deionised water.

Preferably the acid solution of step c) comprises sulphuric acid. Most preferably the acid solution comprises 0% to 80% phosphoric acid and 10% to 80% sulphuric acid. Preferably the solution is alcohol-free.

Preferably the temperature at which step c) is carried out is between 20° C. and 100° C. More preferably between 25° C. and 80° C., particularly at room temperature.

Preferably the cathode is partially covered with a protective element to avoid direct contact of the cathode with the part surface. Preferably the material of the protective element is a polymer. More preferably the polymer is selected between a polyamide or a silicone. The present invention by having a previous step of chemical polishing protects this polymer by shortening the time of electropolishing and therefore the time the polymer is in contact with the acid solution, as this deteriorates with time. In particular, it is preferred that the cathode protector be made of silicone. Silicone is an inert material that can withstand the acid bath with less deterioration than other materials. The silicone shield is net-shaped or has a complementary shape to the cathode with openings to allow the acid solution to act as an electrolyte.

The cathode is preferably shaped in a negative way with respect to the polished part.

Preferably the voltage at which it is worked in the electropolishing step c) is between 2V and 10V. Preferably the duration of the step c) is between 1 min and 60 min. More preferably the time at which this voltage is applied is between 5 min and 15 min.

EXAMPLES

The following examples are only illustrative of this invention, and should not be interpreted as limiting it.

Example 1

It was based on a part obtained by selective laser fusion, the part was made of 316L stainless steel.

The procedure of the invention consisting of a chemical polishing step, a water washing and an electrochemical polishing in this order was compared with a procedure consisting of only the electrochemical polishing step.

In the first step, step a), the part is placed into a bath of an acid solution of 30% $H_3PO_4$, 6% HCl and 2% $HNO_3$; for two hours at a temperature of 70° C.

This was then followed by a deionised water washing bath, step (b) of the procedure.

After this bath, it was proceeded to a bath with an acid solution of 60% $H_3PO_4$ and 40% $H_2SO_4$, for 10 minutes at a temperature of 70° C. where an electropolishing was performed, step c) of the procedure. The anodic current density was 1.5 A/cm2.

The 316L stainless steel starting part had a Ra=6.6 μm and a Rz=56.3 μm. The reduction obtained was the following.

TABLE 1

Roughness and material loss after each step

|  | Initial | Step (a) | Step (c) |
|---|---|---|---|
| Ra (μm) | 6.6 | 4.0 | 2.4 |
| Rz (μm) | 56.3 | 34.5 | 18.6 |
| Material loss (%) |  | 7 | 5 |

TABLE 2

Percentage of reduction of roughness and loss of material with the procedure of the invention and only with the electropolishing step

|  | Example 1 | Electropolishing only |
|---|---|---|
| % reduction of Ra | 63 | 39 |
| % reduction of Rz | 67 | 46 |
| Material loss (%) | 12 | 12 |

This procedure saves energy and material by combining both technologies. Table 2 shows that for the same material loss, the roughness reduction is much greater when chemical polishing and electropolishing are combined. When polishing with electropolishing alone, the conditions were the same as when chemical polishing and electropolishing were combined. If only chemical or electro-polishing was used, these percentages of reduction for 12% material loss would not be achieved, the material loss would be higher.

As can be seen in FIG. 1 the finish of the part subjected to the procedure of the present invention has a mirror finish.

Example 2

It started from a part made of stainless steel by additive manufacturing through selective laser sintering The procedure of the invention consisting of a chemical polishing step, a water washing and an electrochemical polishing in this order was compared with a procedure consisting of only the electrochemical polishing steps.

In both cases the conditions of the electrochemical polishing are the same, the same bath is used and in the same conditions.

In the first step, step a), the part is placed into a bath of an acid solution of 30% $H_3PO_4$, 6% HCl and 2% $HNO_3$; for four hours at a temperature of 70° C.

This was then followed by a deionised water washing bath, step (b) of the procedure.

After this bath, it was proceeded to a bath with an acid solution of 60% $H_3PO_4$ and 40% $H_2SO_4$, for 10 minutes at a temperature of 70° C. where an electropolishing was performed, step c) of the procedure. The voltage was 5V.

TABLE 3

Comparison between the process of the invention and an electropolishing process

|  | Procedure of the invention | Electropolishing |
|---|---|---|
| Initial Ra (μm) | 5.98 | 5.95 |
| Initial mass (g) | 6.1296 | 6.1947 |
| Final mass (g) | 5.4463 | 5.2693 |
| Electropolishing time (min) | 10 | 30 |
| Ra final (μm) | 2.1 | 2.1 |
| Loss of material (%) | 11 | 15 |

As shown in Table 3, to achieve the required roughness, 10 minutes of electropolishing are required thanks to the process described; whereas, for a conventional electropolishing process, 30 minutes are needed. This FIGURE represents a very important energy saving. Moreover, it can be seen how the described process reaches the same final roughness with a loss of 11% of the starting material and, therefore, it also implies a saving in material compared to the conventional electropolishing process.

In summary, the process described in the invention reduces the electropolishing steps by up to 20 min, providing the same finish and consuming less material.

The invention claimed is:

1. A procedure for finishing a stainless steel part manufactured by additive manufacturing comprising the steps of:
    (a) placing the stainless steel part into an acidic aqueous solution with a pH of 0 to 4 comprising a non-oxidizing acid, and an oxidizing acid and a surfactant;
    (b) after step (a) placing the stainless steel part into water;
    (c) after step (b) placing the stainless steel part into an acid solution with a pH between 0 and 4; and
    (d) electropolishing the stainless steel part, wherein the stainless steel part is connected to a positive pole so that the stainless steel acts as an anode and a cathode is connected to a negative pole.

2. The procedure according to claim 1 characterized in that the part is manufactured by SLM additive manufacturing.

3. The procedure according to claim 1 characterized in that the acidic aqueous solution comprises 1% to 50% phosphoric acid, 1% to 20% hydrochloric acid, and 1% to 30% nitric acid.

4. The procedure according to claim 1 characterized in that the temperature of the step a) is between 20° C. and 80° C.

5. The procedure according to claim 1 characterized in that in step c) the acid solution comprises between 0% and 85% phosphoric acid and 10% to 80% sulphuric acid.

6. The procedure according to claim 1 characterized in that in step c) the acid solution does not present alcohol.

7. The procedure according to claim 1 characterized in that the cathode is partially covered with a protective element.

8. The procedure according to claim 7 characterized in that the protective element is made of silicone.

9. The procedure according to claim 1 characterized in that the step c) is carried out at a voltage between 2V and 10V.

\* \* \* \* \*